United States Patent
Khazaai et al.

(10) Patent No.: US 10,955,280 B2
(45) Date of Patent: Mar. 23, 2021

(54) DETECTING FLUID CHARACTERISTICS VIA A FLOAT

(71) Applicant: Bourns, Inc., Riverside, CA (US)

(72) Inventors: Jay Jamshid Khazaai, Commerce, MI (US); James Gregory Stanley, Novi, MI (US); Don Blandino, Sterling Heights, MI (US); Kenneth R. Turner, Waterford, MI (US); Eoin Paul O'Regan, Douglas (IE)

(73) Assignee: Bourns, Inc., Riverside, CA (US)

( * ) Notice: Subject to any disclaimer, the term of this patent is extended or adjusted under 35 U.S.C. 154(b) by 204 days.

(21) Appl. No.: 15/778,079

(22) PCT Filed: Nov. 30, 2016

(86) PCT No.: PCT/US2016/064191
§ 371 (c)(1),
(2) Date: May 22, 2018

(87) PCT Pub. No.: WO2017/095906
PCT Pub. Date: Jun. 8, 2017

(65) Prior Publication Data
US 2018/0348108 A1   Dec. 6, 2018

Related U.S. Application Data

(60) Provisional application No. 62/318,620, filed on Apr. 5, 2016, provisional application No. 62/260,928, filed on Nov. 30, 2015.

(51) Int. Cl.
*G01F 23/62*   (2006.01)
*G01N 9/10*   (2006.01)
(Continued)

(52) U.S. Cl.
CPC .............. *G01F 23/62* (2013.01); *F01N 11/00* (2013.01); *G01D 21/02* (2013.01); *G01F 23/72* (2013.01);
(Continued)

(58) Field of Classification Search
CPC .. G01N 9/18; G01N 9/20; G01N 9/14; G01N 9/10; G01F 23/62; G01F 23/68; G01F 23/2963; G01F 23/0038
See application file for complete search history.

(56) References Cited

U.S. PATENT DOCUMENTS 3,754,446 A * 8/1973 O'Connor ............... G01F 23/62
 73/453
3,964,317 A * 6/1976 Blanchard ................ G01N 9/20
 73/453

(Continued)

FOREIGN PATENT DOCUMENTS

CN   101025358 A   8/2007
CN   101142464 A   3/2008
(Continued)

OTHER PUBLICATIONS

BITRON, "Automotive Products," <http://www.bitron.net/index.php?option=com_content&view=article&id=370&Itemid=37> webpage available at least as early as Sep. 17, 2015.
(Continued)

*Primary Examiner* — Helen C Kwok
(74) *Attorney, Agent, or Firm* — Michael Best & Friedrich LLP (57) ABSTRACT

A system for detecting a characteristic of a fluid. In one example, the system includes a tube, a float, a sensor, and a controller. The tube is configured to receive the fluid. The float is located within the tube. The sensor is configured to sense a position of the float. The controller is configured to
(Continued)

receive, from the sensor, the position of the float, and determine a characteristic of the fluid based on the position of the float. The characteristic may be a density or a concentration.

26 Claims, 12 Drawing Sheets

(51) Int. Cl.
  *G01F 25/00* (2006.01)
  *G01N 9/18* (2006.01)
  *F01N 11/00* (2006.01)
  *G01D 21/02* (2006.01)
  *G01F 23/72* (2006.01)

(52) U.S. Cl.
  CPC ........... *G01F 25/0061* (2013.01); *G01N 9/10* (2013.01); *G01N 9/18* (2013.01); *F01N 2560/00* (2013.01); *F01N 2610/02* (2013.01); *F01N 2900/1814* (2013.01)

(56) References Cited

U.S. PATENT DOCUMENTS

| | | | |
|---|---|---|---|
| 4,371,837 A | 2/1983 | Sieverin | |
| 4,400,978 A * | 8/1983 | Guay | G01N 9/20 73/453 |
| 4,920,797 A | 5/1990 | Swartz et al. | |
| 5,253,522 A * | 10/1993 | Nyce | G01F 23/2963 324/207.13 |
| 5,471,873 A | 12/1995 | Nyce et al. | |
| 5,815,091 A | 9/1998 | Dames et al. | |
| 5,830,375 A * | 11/1998 | Huang | H01L 21/31111 216/84 |
| 5,900,547 A * | 5/1999 | Bartkiewicz | G01N 9/18 73/32 R |
| 6,218,949 B1 | 4/2001 | Issachar | G01F 23/62 340/603 |
| 6,418,788 B2 | 7/2002 | Articolo | |
| 8,978,464 B2 | 3/2015 | Prinstil | |
| 10,379,023 B2 * | 8/2019 | Garrido Garza | G01N 9/18 |
| 2001/0029782 A1 * | 10/2001 | Articolo | G01F 23/46 73/314 |
| 2002/0005715 A1 * | 1/2002 | Sato | G01F 1/24 324/207.2 |
| 2006/0248952 A1 * | 11/2006 | Jarvie | G01F 23/2963 73/444 |
| 2006/0266113 A1 | 11/2006 | Hart | |
| 2008/0223130 A1 * | 9/2008 | Snell | G01N 9/18 73/450 |
| 2009/0064777 A1 * | 3/2009 | Mundo | G01F 23/38 73/317 |
| 2011/0078692 A1 | 3/2011 | Nickolls et al. | |
| 2011/0187529 A1 * | 8/2011 | Maurer | G01N 33/2852 340/540 |
| 2012/0255353 A1 | 10/2012 | Kozaki et al. | |
| 2013/0000741 A1 | 1/2013 | Crary | |
| 2013/0037138 A1 * | 2/2013 | Georis | F01N 3/2066 137/551 |
| 2013/0167622 A1 | 7/2013 | Frivik | |
| 2014/0157992 A1 * | 6/2014 | Farotto | G01N 9/14 99/276 |
| 2014/0224010 A1 * | 8/2014 | Prinstil | G01F 23/30 73/313 |
| 2015/0013646 A1 | 1/2015 | Qi | |
| 2016/0123789 A1 | 5/2016 | Deak et al. | |
| 2017/0010147 A1 | 1/2017 | Deak et al. | |
| 2018/0037451 A1 * | 2/2018 | Johnson | G01F 1/007 |
| 2018/0073910 A1 | 3/2018 | Deak et al. | |

FOREIGN PATENT DOCUMENTS

| | | |
|---|---|---|
| EP | 1072872 A2 | 1/2001 |
| GB | 2270758 A | 3/1994 |
| JP | S55141050 U | 10/1980 |
| JP | H08136208 A | 5/1996 |
| JP | H111287696 A | 10/1999 |
| JP | 2009236615 A | 10/2009 |
| JP | 2012225774 A | 11/2012 |
| WO | 2017095906 A1 | 6/2017 |

OTHER PUBLICATIONS

International Search Report and Written Opinion for Application No. PCT/US2016/064191 dated Mar. 29, 2017 (16 pages).
International Search Report and Written Opinion for Application No. PCT/US2016/064202 dated Mar. 17, 2017 (11 pages).
European Patent Office Partial Supplementary Search Report for Application No. 16871411.1 dated Sep. 24, 2019 (10 pages).
United States Patent Office Action for U.S. Appl. No. 15/778,083 dated Nov. 19, 2019 (13 pages).
Chinese Patent Office Action for Application No. 201680068496.3 dated May 29, 2019 (21 pages, English translation included).
International Preliminary Report on Patentability for Application No. PCT/US2016/064202 dated Jun. 14, 2018 (10 pages).
International Preliminary Report on Patentability for Application No. PCT/US2016/064191 dated Jun. 14, 2018 (15 pages).
Chinese Patent Office Action for Application No. 201680069513.5 dated Mar. 18, 2020 (24 pages, English translation included).
European Patent Office Extended Search Report for Application No. 16871411.1 dated Feb. 27, 2020 (11 pages).
European Patent Office Extended Search Report for Application No. 16871415.2 dated Feb. 6, 2020 (6 pages).
Japanese Patent Office Action for Application No. 2018-527892 dated Mar. 11, 2020 (14 pages, English translation included).
Japanese Patent Office Action for Application No. 2018-527980 dated Jun. 10, 2020 (13 pages, English translation included).
United States Patent Office Action for U.S. Appl. No. 15/778,083 dated May 12, 2020 (10 pages).
Notice of Preliminary Rejection issued from the Korea Patent Office for related Application No. 10-2018-7014791 dated Sep. 22, 2020 (9 Pages including English Translation).

* cited by examiner

DETECTING FLUID CHARACTERISTICS VIA A FLOAT

RELATED APPLICATIONS

This application claims the benefit of U.S. Provisional Patent Application No. 62/260,928, filed on Nov. 30, 2015, and U.S. Provisional Patent Application No. 62/318,620, filed on Apr. 5, 2016, the entire contents of which are incorporated herein by reference.

TECHNICAL FIELD

Embodiments relate to sensing the density or concentration of fluids.

SUMMARY

Fluid density and concentration sensing is useful in a number of vehicle applications including, for example, sensing the characteristics of Diesel Exhaust Fluid (DEF) used in a selective catalytic reduction diesel emission-control system. Selective catalytic reduction (SCR) is a method of converting diesel oxides of nitrogen (NOx) emissions, by catalytic reaction, into diatomic benign nitrogen gas ($N_2$) and water ($H_2O$).

DEF is a mixture of purified water and urea. In a typical SCR system, DEF is stored in a tank of a vehicle and is injected into the exhaust. The injected urea breaks down NOx in the exhaust into nitrogen, water, and carbon dioxide. When contaminants such as diesel fuel and ethylene glycol, mix with the DEF, the ability of the DEF to reduce the NOx in the exhaust is diminished. Contaminated DEF may also cause damage to the SCR system.

Although various sensors and techniques are available to sense or determine density, concentration, or level of DEF, such sensors and techniques are not always satisfactory.

One embodiment provides a system for detecting a characteristic of a fluid. In one example, the system includes a tube, a float, a sensor, and a controller. The tube is configured to receive the fluid. The float is located within the tube. The sensor is configured to sense a position of the float. The controller is configured to receive, from the sensor, the position of the float, and determine a characteristic of the fluid based on the position of the float. The characteristic is at least one selected from the group consisting of a density and a concentration.

Another embodiment provides a method of detecting a characteristic of a fluid. In one example, the method includes sensing, via a sensor, a position of a float located within a tube configured to receive the fluid and determining, via a controller, a characteristic of the fluid based on the position of the float. In one example, the characteristic is at least one selected from the group consisting of a density and a concentration. In some embodiments, the float sensor may directly or indirectly communicate the determined information or data to external devices through a connection. The connection may be analog or digital, for example via a communication bus. The connection may be implemented to support a pulse-width modulation (PWM) protocol, a controller area network (CAN) protocol, a single edge nibble transmission (SENT) protocol, a local interconnect network (LIN) protocol, or another communication protocol.

Another embodiment provides a fluid sensor including a cage, a float, a permanent magnet, and a magnetic switch. In one example, the cage is located within a tank configured to hold fluid. The cage includes an opening to allow the fluid into the cage and reduce or eliminate the laminar and turbulence flows within the cage. The float is located within the cage and has a float density that is a predetermined density. The permanent magnet is mechanically coupled to the float. The permanent magnet is configured with a magnetic field that reduces effects of external magnetic fields. The magnetic switch is configured to determine a position of the float within the cage. A state of the magnetic switch indicates whether a fluid density of the fluid is less than the predetermined density.

Another embodiment provides a fluid sensor including a magnetic switch and a sensing integrated circuit. The magnetic switch is configured to determine a position of a float. In one example, the position of the float relates to a density of a fluid. The sensing integrated circuit includes a magnetic angle sensor, a temperature sensor, and a digital input. The magnetic angle sensor is configured to measure an angle of a magnetic field. In one example, the angle of the magnetic field relates to a fluid level of the fluid. The temperature sensor is configured to measure a temperature of the fluid. The digital input is coupled to the magnetic switch. In one example, the sensing integrated circuit is configured to transmit an output signal that relates to the fluid level, the temperature of the fluid, and the density of the fluid.

Other aspects will become apparent by consideration of the detailed description and accompanying drawings.

DETAILED DESCRIPTION

Before any embodiments are explained in detail, it is to be understood that embodiments are not limited in their application to the details of construction and the arrangement of components set forth in the following description or illustrated in the following drawings. Other embodiments are possible and methods and systems described herein are capable of being practiced or of being carried out in various ways.

Figure 1A:
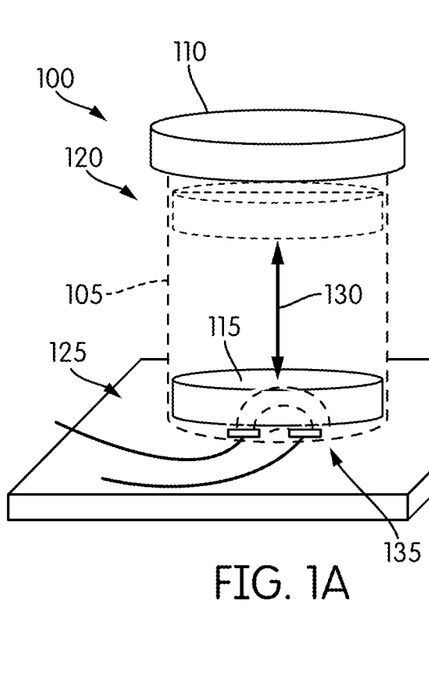
FIG. 1A is a perspective view illustrating a sensing system according to one embodiment.

FIG. 1A illustrates a sensing system 100 according to some embodiments. In the example illustrated, the sensing system 100 includes a guiding tube 105, a cap 110, and a float, or floating mass 115 located within the guiding tube 105. The guiding tube 105 is configured to receive and contain a fluid to be sensed. The fluid may be any fluid, such as an automotive fluid, for example, diesel exhaust fluid (DEF), brake fluid, oil, fuel, transmission fluid, washer fluid, and refrigerant.

The guiding tube 105 includes a top section 120, a bottom section 125, and a vertical axis 130. The float 115 moves within the guiding tube 105, based on one or more characteristics (for example, density) of the fluid, along a vertical axis 130. In the illustrated embodiment, the sensing system 100 also includes a sensor 135 located proximate the bottom section 125 of the guiding tube 105.

The sensor 135 is a sensor operable to sense the position of the float 115. For example, in one embodiment, the sensor 135 may be an analog sensor configured to continuously sense the location of the float 115 and output the sensed location in real-time. In other embodiments, the sensor 135 may be a digital sensor configured to detect when the float 115 is within a predetermined distance of the sensor 135. In such an embodiment, the sensor 135 outputs data once the float has crossed the predetermined distance. In some embodiments, the sensor 135 is a proximity sensor. In some embodiments, the sensor 135 is a magnetic sensor (for example, a Hall effect sensor). In such an embodiment, the float 115 may include, or be formed of, a magnetic material. In other embodiments, the sensor 135 may be, for example, an inductive sensor, a capacitive sensor, an optical sensor, or other sensor configured to detect the presence of the float 115.

In some embodiments of operation, the float 115 moves along the vertical axis 130 based on the density of the fluid to be sensed. The float 115 may be designed such that the vertical movement corresponds to a predetermined threshold density. For example, if a density of the fluid within the tube 105 is greater than the predetermined threshold density, the float 115 will move in the vertical axis 130 away from the sensor 135, thus indicating the fluid within the tube 105 is above an acceptable density threshold. If the density of the fluid within the tube 105 is less than the predetermined threshold density, the float 115 will move in the vertical axis 130 toward the sensor 135, thus indicating the fluid within the tube 105 is below an acceptable density threshold. If the density of the fluid within the tube 105 is approximately equal to the predetermined threshold density, the float 115 will float within the fluid at a position located an approximate equal distance between the top section 120 and the bottom section 125 of the tube 105. In some embodiments, the float 115 floating within the fluid indicates an unacceptable density.

In other embodiments, the vertical movement of the float 115 may correspond to a level of the fluid. For example, if a density of the fluid within the tube 105 is greater than the predetermined threshold density, the float 115 will move in the vertical axis 130 away from the sensor 135, thus indicating the fluid within the tube 105 is above an acceptable level and above an acceptable density threshold.

Figure 1B:
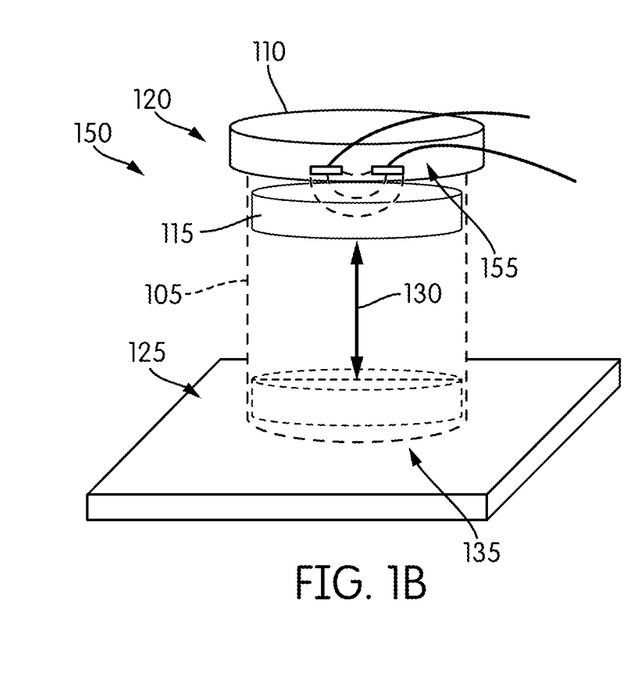
FIG. 1B is a perspective view illustrating a sensing system according to another embodiment.

FIG. 1B illustrates sensing system 150 according to one embodiment. Sensing system 150 may be substantially similar to sensing system 100 and include substantially similar components. For example, sensing system 150 may include guiding tube 105, cap 110, and float 115. Sensing system 150 may further include a sensor 155 located proximate top section 120 of the guiding tube 105. In other embodiments, the sensing systems 100, 150 may include one or more sensors located proximate a side of the guiding tube.

In some embodiments of operation of sensing system 150, the float 115 moves in the vertical axis 130 based on the density of the fluid to be sensed. The float 115 may be designed such that the vertical movement corresponds to a predetermined threshold density. For example, if the density of the fluid within the tube 105 is greater than the predetermined threshold density, the float 115 will move in the vertical axis 130 toward the sensor 155, thus indicating the fluid within the tube 105 is above an acceptable density. If the density of the fluid within the tube 105 is less than the predetermined threshold density, the float 115 will move in the vertical axis 130 away from the sensor 155, thus indicating the fluid within the tube 105 is below an acceptable density.

The float 115 may be formed to have a density approximately equal to the predetermined threshold density over a range of temperatures. The float 115 may be formed of one or more materials. For example, in some embodiments, the float 115 is formed of a mix of ferrous/magnetic and plastic (for example, Acrylonitrile butadiene styrene (ABS) materials). Additionally, the float 115 may be formed of a material having a low water absorption.

In some embodiments of operation, the equations set forth below may be used. In these equations, $W_{fm}$ is the weight of the float 115, $B_{fmm}$ is the buoyancy of the float 115, $F_{mfm}$ is the mechanical constraint on the float 115, $M_{fm}$ is the mass of the float 115, $\rho_{fm}$ is the density of the float 115, $V_{fm}$ is the volume of the float 115, and $\rho_{fluid}$ is the density of the fluid.

$$\vec{W}_{fm} + \vec{B}_{fmm} + \vec{F}_{mfm} = \underbrace{(-M_{fm} * g)}_{|W_{fm}|} + \underbrace{(\rho_{fluid} * V_{fm} * g)}_{|B_{fmm}|} + \vec{F}_{mfm} = 0 \quad \text{(Eqn. 1)}$$

$$\text{If } \vec{F}_{mfm} = 0, \text{ then } \rho_{fluid} = \frac{M_{fm}}{V_{fm}} = \rho_{fm} \quad \text{(Eqn. 2)}$$

The float 115 is configured to freely move within the fluid, with no mechanical constraint, thus, $F_{mfm}=0$. In some embodiments, density $\rho_{fm}$ may be selected to be approximately equal to the predetermined density threshold. In other embodiments, for example, the embodiment illustrated in FIG. 1A, float density $\rho_{fm}$ may be selected to be slightly greater than the predetermined density threshold. In such an embodiment, when the fluid density $\rho_{fluid}$ is approximately equal to the predetermined density threshold, the float 115 will move toward the bottom section 125 of the tube 105 along the vertical axis 130. In other embodiments, for example, the embodiment illustrated in FIG. 1B, float density $\rho_{fm}$ may be selected to be slightly less than the predetermined density threshold. In such an embodiment, when the fluid density $\rho_{fluid}$ is approximately equal to the predetermined density threshold, the float 115 will stay at the top section 120 of the tube 105 along the vertical axis 130, unless the $\rho_{fluid}$ is lower than the threshold. When this condition occurs, the float 115 will move to the bottom section 125.

The fluid density $\rho_{fluid}$ corresponds to a concentration of the fluid. Thus, changes in concentration of the fluid also results in movement of the float 115. For example, if the concentration of the fluid increases, and passes above the threshold, the float 115 will move toward the top section 120 of the guiding tube 105. Conversely, if the concentration of the fluid decreases, and falls below the threshold, the float 115 will move toward the bottom section 125 of the guiding tube 105.

The float 115 may be formed such that the float density $\rho_{fm}$ is substantially equal to, the fluid density $\rho_{fluid}$ across a range of temperatures. Such a float 115 would have a density temperature coefficient approximately equal to a fluid density temperature coefficient, as illustrated in Equation 3 below.

$$\rho_{fm} \approx \rho_{fluid}\left(\frac{Kg}{m^3}\right) \rightarrow$$ (Eqn. 3)

$$\underline{\rho_{fm}(T_0)*(1+\alpha_{fm}*\Delta T) \approx \rho_{fluid}(T_0)\times(1+\alpha_{fluid}\times\Delta T)}$$
$$\alpha_{fm}\approx\alpha_{fluid}\left(\frac{Kg/m^3}{Kg/m^3 C^\circ}\right), \rho_{fm}(T_0)\approx\rho_{fluid}(T_0)$$

In Eqn. 3 above, $\alpha_{fm}$ is the float density temperature coefficient and $\alpha_{fluid}$ is the fluid density temperature coefficient.

In some embodiments, the float 115 is formed of a single material. In such an embodiment, the float density temperature coefficient $\alpha_{fm}$ and the fluid density temperature coefficient $\alpha_{fluid}$ should be approximately equal over a predetermined temperature range. This results in a coefficient of thermal expansion (CTE) of the fluid and the float to remain substantially equal over the range of operating temperatures.

Figure 2:
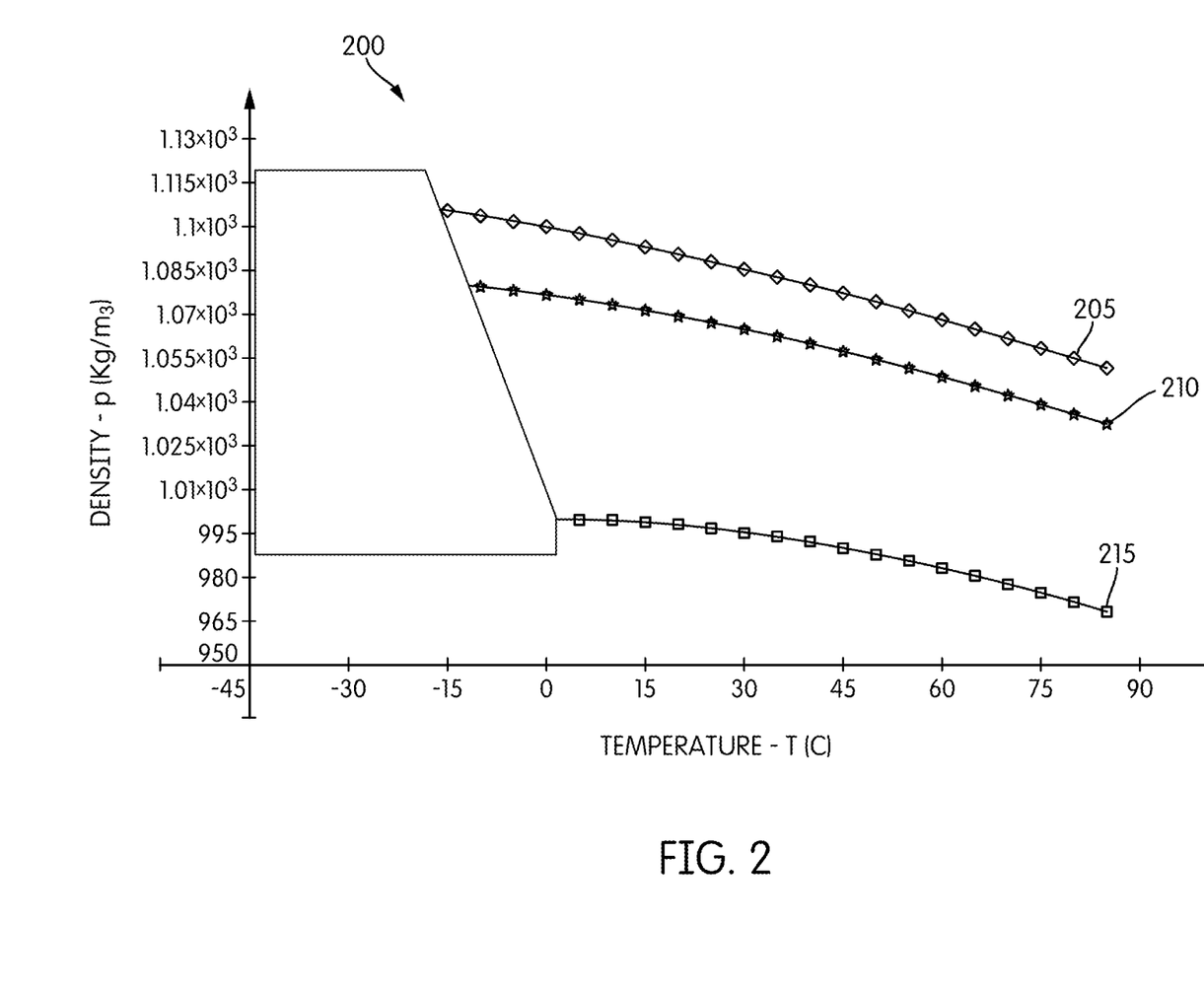
FIG. 2 is a graph illustrating density versus temperature according to some embodiments.

FIG. 2 is a graph 200 illustrating density versus temperature according to some embodiments. Graph 200 includes a first line 205, a second line 210, and a third line 215. In the illustrated embodiment, first line 205 corresponds to DEF, second line 210 corresponds to a float 115 formed of a single material according to one embodiment, and third line 215 corresponds to water. As illustrated, over the predetermined temperature range, the float density $\rho_{fm}$ (illustrated by second line 210) is slightly less than the fluid density $\rho_{fluid}$ (illustrated by first line 205). The float density $\rho_{fm}$ is selected to be a percentage of the fluid density $\rho_{fluid}$. A float 115 having a float density temperature coefficient $\alpha_{fm}$ approximately equal to the density temperate coefficient $\alpha_{fluid}$ results in a density ratio that is maintained over a broad range of temperatures. Such a float 115 may substantially reduce false alarms over the broad range of temperatures. In other embodiments, the float density $\rho_{fm}$, may be above the fluid density $\rho_{fluid}$ in order to detect an over density condition.

In some embodiments, the float 115 is formed of two different materials, for example a first material fm1 and a second material fm2. In such an embodiment, the respective volumes and densities of the first material fm1 and the second material fm2 may be determined according to the equations set forth below. In some embodiments, the first material fm1 may be a material configured to float in the fluid and the second material fm2 may be a material configured to be sensed by sensor 135, 155.

$$M_{fm} = M_{fm1} + M_{fm2}$$ (Eqn. 4)

$$V_{fm} = V_{fm1} + V_{fm2}$$ (Eqn. 5)

$$V_{fm1} = \frac{M_{fm1}}{\rho_{fm1}}$$ (Eqn. 6)

-continued $$V_{fm2} = \frac{M_{fm2}}{\rho_{fm2}}$$ (Eqn. 7)

$$V_{fm} = \frac{M_{fm}}{\rho_{fm}}$$ (Eqn. 8)

$$V_{fm2} = \left(\frac{\rho_{fluid} - \rho_{fm1}}{\rho_{fm2} - \rho_{fluid}}\right), \text{ where:}$$ (Eqn. 9)

$$\rho_{fm1} \leq \rho_{fluid} < \rho_{fm2} \ \& \ V_{fm2} < V_{fm1}$$

In the equations above, $M_{fm}$ is the total mass of the float 115, $M_{fm1}$ is the mass of the first material fm1, $M_{fm2}$ is the mass of the second material fm2, $V_{fm}$ is the total volume of the float, $V_{fm1}$ is the volume of the first material fm1, $V_{fm2}$ is the volume of the second material fm2, $\rho_{fm}$ is the total density of the float 115, $\rho_{fm1}$ is the density of the first material fm1, and $\rho_{fm2}$ is the density of the second material fm2.

Figure 3:
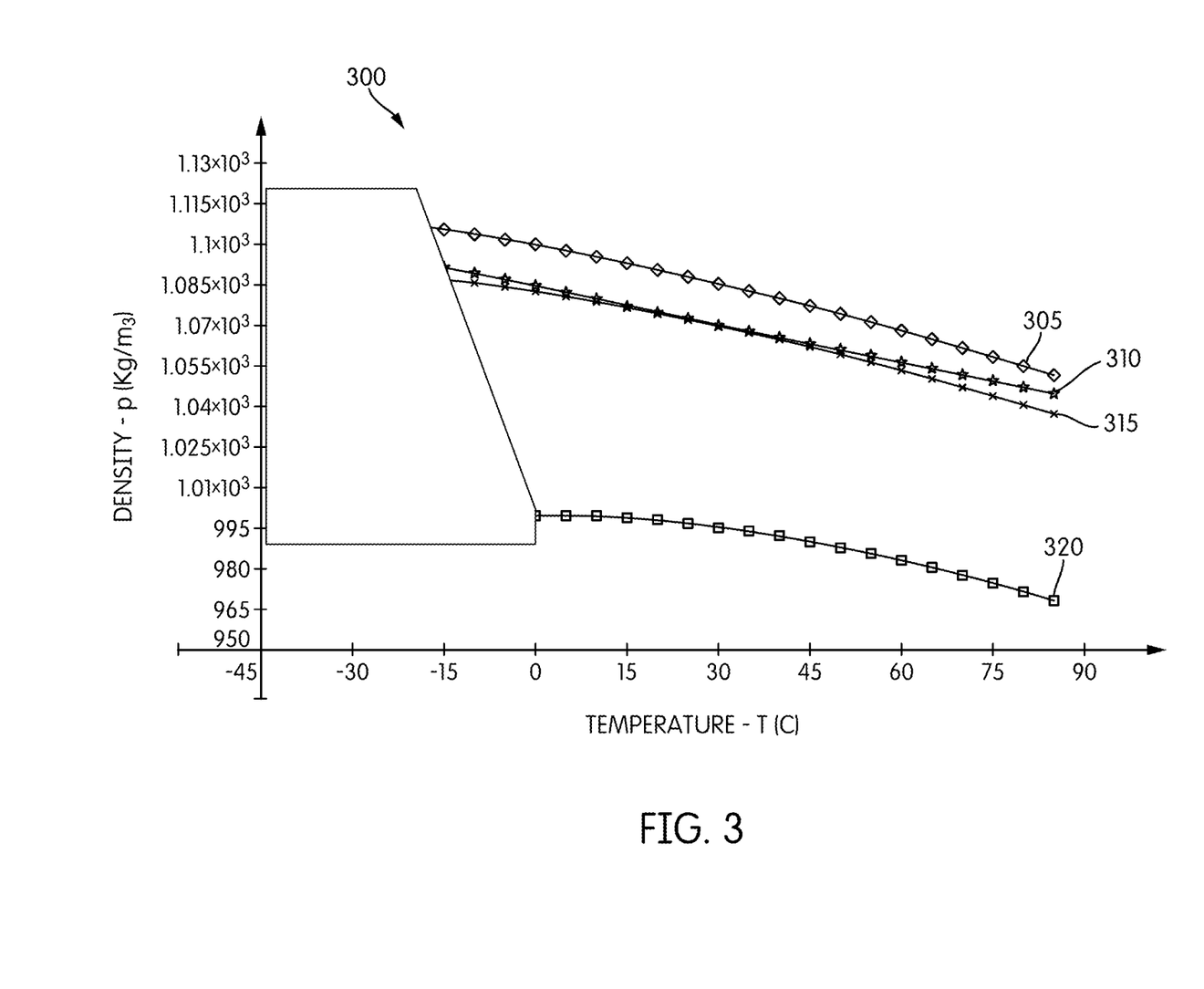
FIG. 3 is a graph illustrating density versus temperature according to some embodiments.

FIG. 3 is a graph 300 illustrating density versus temperature. Graph 300 includes a first line 305, a second line 310, a third line 315, and a fourth line 320. In the illustrated embodiment, first line 305 corresponds to DEF, second line 310 corresponds to float 115 formed of the first material fm1 and the second material fm2 according to one embodiment, third line 315 corresponds to the predetermined density threshold, and fourth line 320 corresponds to water.

Figure 4A:
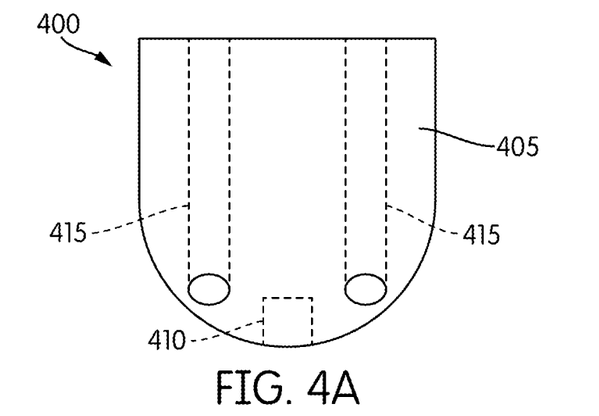
FIGS. 4A-4C illustrate a float of a sensing system according to some embodiments.
Figure 4B:
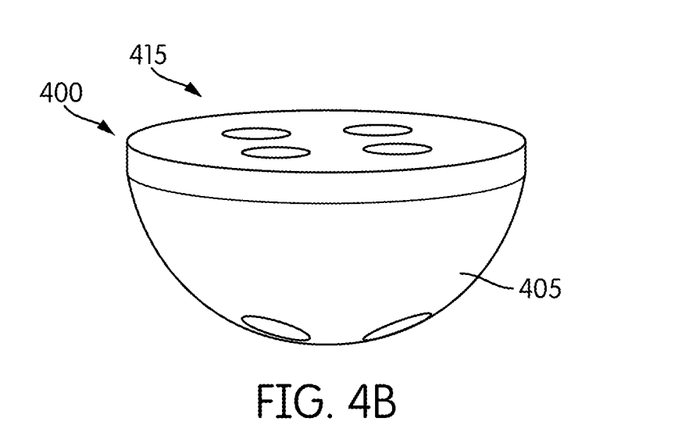
Figure 4C:
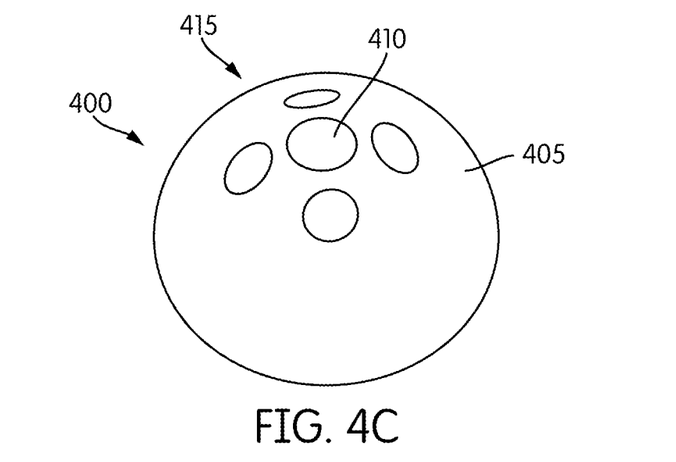

FIGS. 4A-4C illustrate a float 400 according to some embodiments. Float 400 may include a float material 405, a target material 410, and a plurality of channels 415. In the illustrated embodiment, float 400 has a hydrodynamic shape to promote stable movement along the guiding tube 105 and alignment with the sensor 135. The plurality of channels 415 further promote stable movement and alignment of the float 400.

The float material 405 is configured to promote flotation of the float 400. In some embodiments, the float material 405 is formed of a plastic material, for example Acrylonitrile butadiene styrene (ABS). The float material 405 may have a density of approximately 800 kg/m³ to approximately 900 kg/m³ (for example, approximately 850 kg/m³).

The target material 410 is configured to be sensed by sensors 135, 155. In some embodiments, the target material 410 is formed of a magnet, for example a ceramic magnet. The target material 410 may have a density of approximately 4800 kg/m³ to approximately 4900 kg/m³ (for example, approximately 4850 kg/m³). In the illustrated embodiment, the target material 410 is integrated into a bottom portion 420 of the float 400.

Figure 5A:
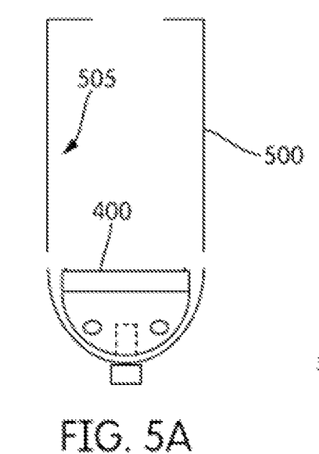
FIG. 5A-5C illustrate a sensing system according to embodiments.
Figure 5B:
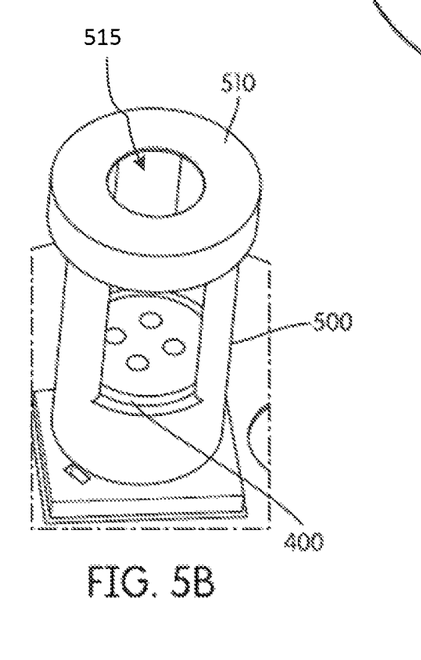
Figure 5C:
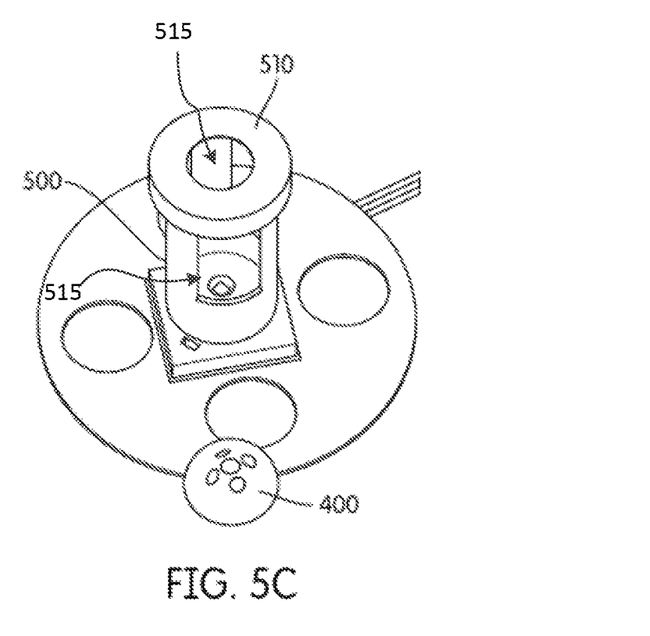

FIGS. 5A-5C illustrate a guiding tube 500 according to some embodiments. As illustrated, guiding tube 500 is configured to receive float 400. The guiding tube 500 and float 400 include surfaces (for example, tube surface 505) providing a substantially frictionless, or low friction contacts. In some embodiments, the surfaces are hydrophilic surfaces configured to prevent formation of air-bubbles. The guiding tube 500 further includes a stopper 510 and a plurality of openings 515. The stopper 510 limits the upward movement of float 400. The plurality of openings 515 allow the fluid to flow in and out of the guiding tube 500.

Figure 6:
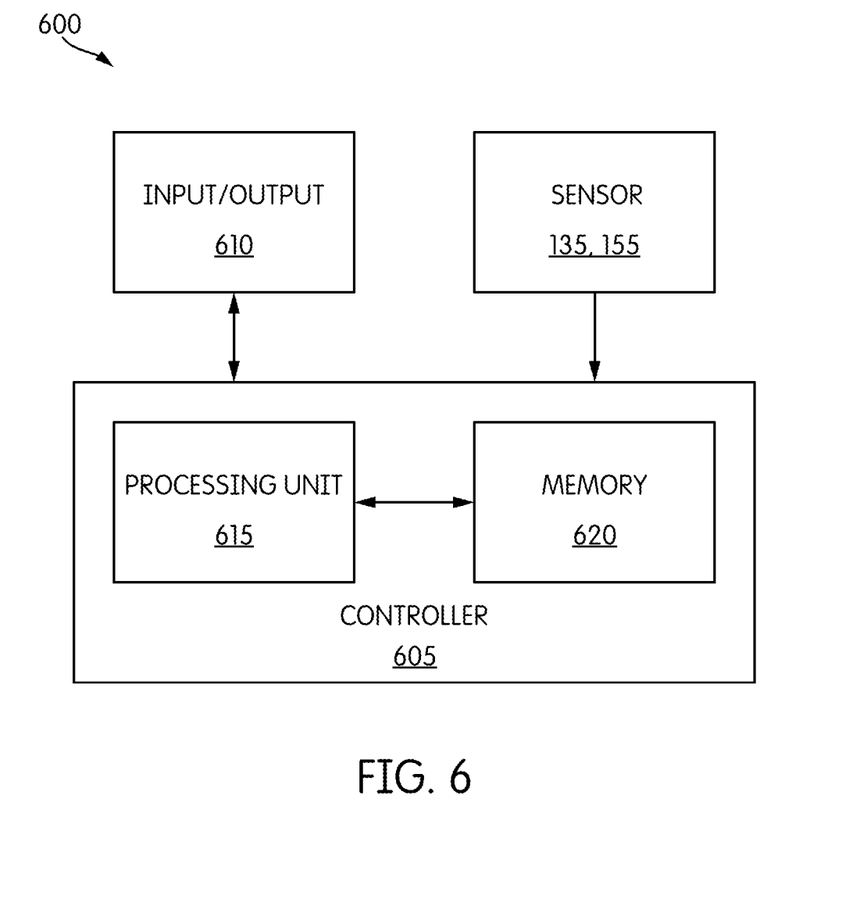
FIG. 6 is a block diagram illustrating a control system of a sensing system according to some embodiments.

FIG. 6 is a block diagram of a control system 600 of the sensing system 100. Control system 600 may also be used in conjunction with other embodiments and performed with one or more methods or operations discussed herein. Control system 600 includes a controller 605, an input/output module 610, and sensors 135, 155. The controller 605 includes an electronic processor, or processing unit, 615 and a memory 620. The memory 620 stores instructions executable by the processing unit 615. In some instances, the controller 605 includes one or more of a microprocessor, digital signal processor (DSP), field programmable gate array (FPGA), application specific integrated circuit (ASIC), or the like. In some embodiments, the controller 605 further includes the input/output module 610.

The input/output module 610 provides wired and/or wireless communication between the control system 600 and an external device. In some embodiments, the external device is a computer and/or control system of a motor vehicle. In such an embodiment, the input/output module 610 may include a digital port, such as a port compliant with the J1939 or controller area network (CAN) standards. The input/output module 610 provides a mechanism for communicating with the vehicle's data bus. In other embodiments, the input/output module 610 may communicate with the external device using a suitable analog or digital signal, depending on the needs of the specific application. In some embodiments, the sensing systems 135, 155 may directly output the information signal via an analog line, or via a digital line, for example a communication bus implemented in accordance with a pulse-width modulation (PWM) protocol, a controller area network (CAN) protocol, a single edge nibble transmission (SENT) protocol, a local interconnect network (LIN) protocol, or another protocol.

Figure 7A:
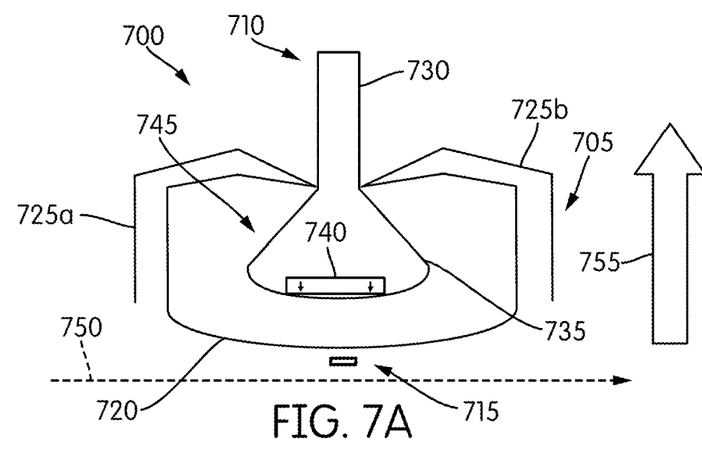
FIGS. 7A-7C illustrate a sensing system according to another embodiment.
Figure 7B:
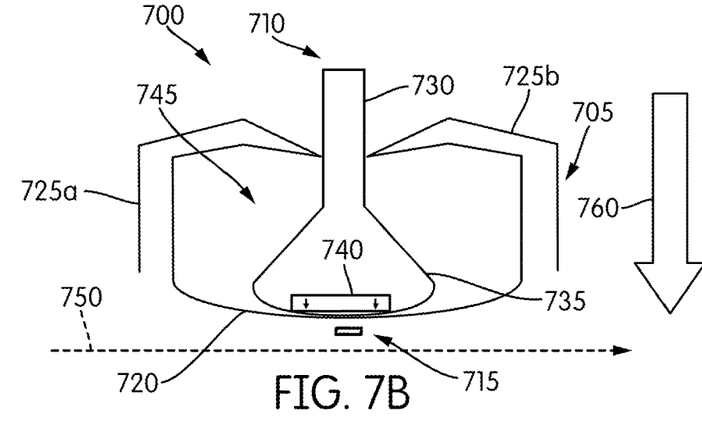
Figure 7C:
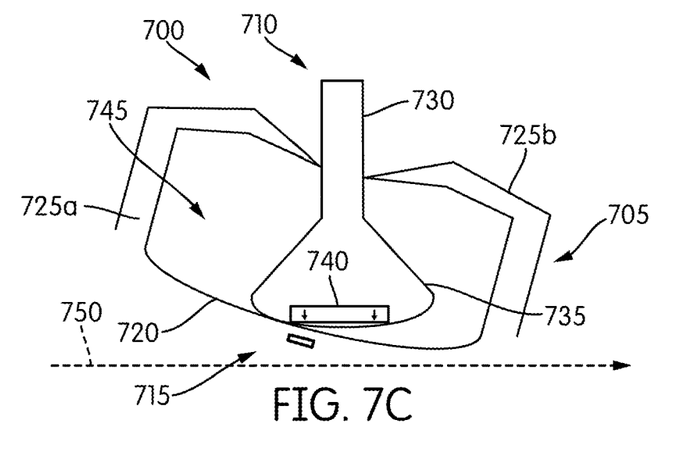

FIGS. 7A-7C illustrate a cross-section of a sensing system 700 according to another embodiment. In some embodiments, the sensing system 700 is located within a tank, or reservoir, containing a fluid. The sensing system 700 includes a guide tube 705, a float 710, and a sensor 715. In the illustrated embodiment, the guide tube 705 includes a base 720 and first and second arms 725a, 725b extending from said base 720. Additionally, in the illustrated embodiment, the float 710 includes a top section 730 and a base section 735. The float 710 may further include a target, or target material, 740 located within the base section 735. In the illustrated embodiment, the sensor 715 is located, within, or proximate, the base 720 of the guide tube 705 and configured to sense the target 740 of the float 710. The sensor 715 may be similar to sensor 135 discussed above.

In operation, the fluid to be sensed is received within a sensing area 745. The float 710 moves, with respect to a density of the fluid, within the sensing area 745. The first and second arms 725a, 725b guide and/or contain the float 710, via the top section 730, within the sensing area 745, while the sensor 715 senses a position of the target 740 of the float 710.

Sensing system 700 is configured to accurately sense the fluid within the sensing area 745 while displaced at a variety of angles. For example, the sensing system 700 may accurately sense the fluid when at an angle within a range of approximately 0° to approximately 15°.

FIG. 7A illustrates the sensing system 700, at a first angle, sensing a fluid having a density higher than the predetermined density threshold. As illustrated, the first angle is approximately 0° with respect to a horizontal reference line (or horizon) 750. Thus, as illustrated, float 710 moves in a first direction, illustrated by arrow 755, away from sensor 715. FIG. 7B illustrates the sensing system 700, at the first angle, sensing a fluid having a density lower than the predetermined density threshold. Thus, as illustrated, float 710 moves in a second direction, illustrated by arrow 760, toward the sensor 715.

FIG. 7C illustrates the sensing system 700, at a second angle, sensing a fluid having a density less than the predetermined density threshold. As illustrated, the second angle is greater than 0° with respect to the horizontal reference line 750. In some embodiments, the second angle may be within a range of slightly above 0° to approximately 15°. As illustrated, sensing system 700 is configured to measure a characteristic of fluid while at a variety of operating angles.

FIGS. 8A-8D illustrate a cross-section of a sensing system 800 according to another embodiment. In some embodiments, the sensing system 800 is located within a tank containing a fluid. The sensing system 800 includes a guide tube 805, a float 810, and a sensor 815. The sensor 815 may be similar to sensor 135 discussed above. In the illustrated embodiment, the guide tube 805 includes top wall 820 and a base 825 having an angled portion 830 contoured to allow the float 810 to stay oriented with respect to a horizontal reference line 835 when the float 810 is positioned near the base 825. Additionally, in the illustrated embodiment, the float 810 includes a top portion 837 having an angled portion 840 contoured to allow the float 810 to stay oriented with respect to the horizontal reference line 835 when the float 810 is positioned near the top wall 820.

Figure 8A:
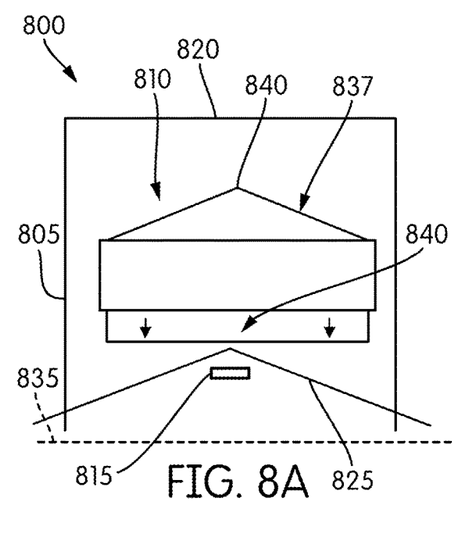
FIGS. 8A-8D illustrate a sensing system according to another embodiment.
Figure 8B:
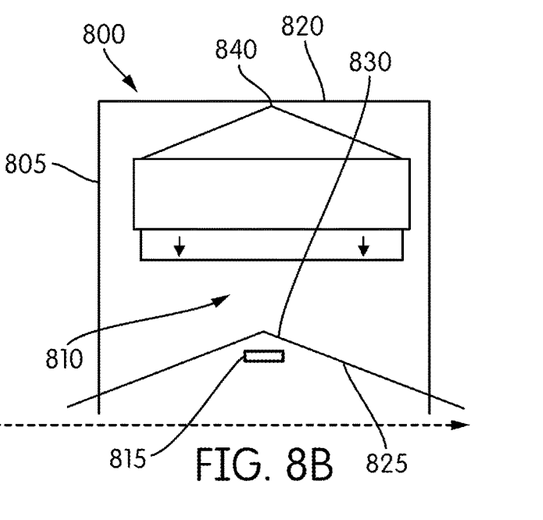

FIG. 8A illustrates the sensing system 800, at a first angle, sensing a fluid having a density lower than the predetermined density threshold. As illustrated, the first angle is approximately 0° with respect to horizontal reference line 835. FIG. 8B illustrates the sensing system 800, at the first angle, sensing a fluid having a density higher than the predetermined density threshold.

Figure 8C:
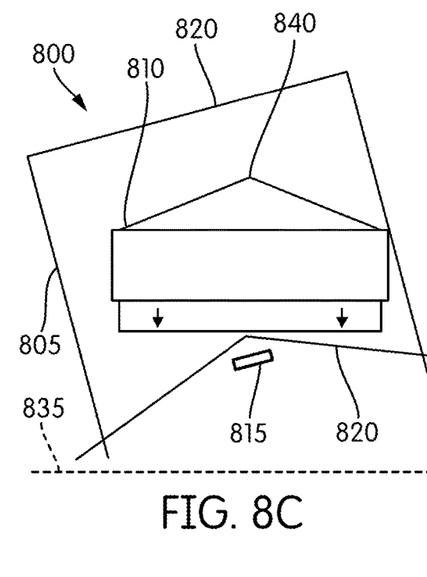
Figure 8D:
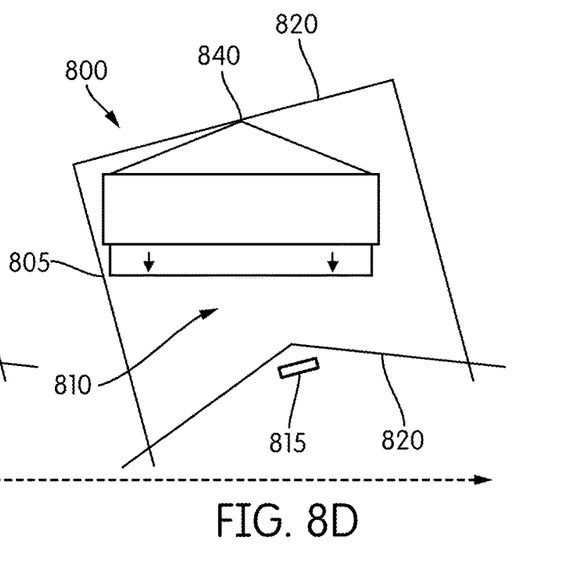

FIG. 8C illustrates the sensing system 800, at a second angle, sensing a fluid having a density lower than the predetermined density threshold. As illustrated, the second angle is greater than 0° with respect to the horizontal reference line 835. In some embodiments, the second angle may be within a range of slightly above 0° to approximately 15°. FIG. 8D illustrates the sensing system 800, at the second angle, sensing a fluid having a density higher than the predetermined density threshold. As illustrated, sensing system 800 is configured to measure a characteristic of fluid while at a variety of operating angles.

Figure 9A:
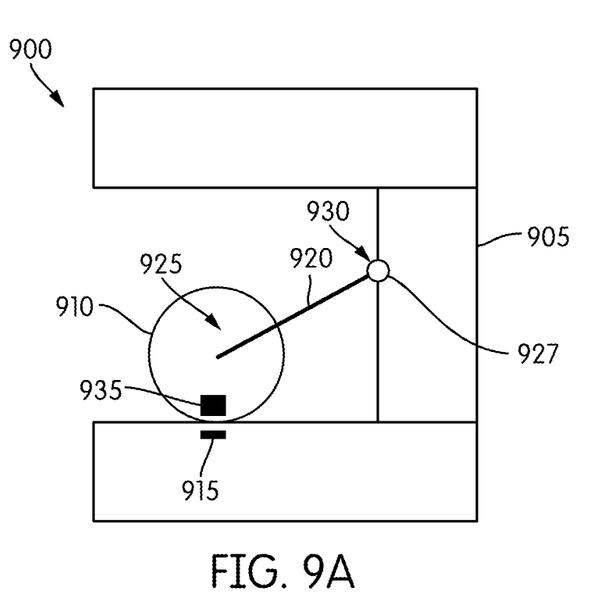
FIGS. 9A-9B illustrate a sensing system according to another embodiment.
Figure 9B:
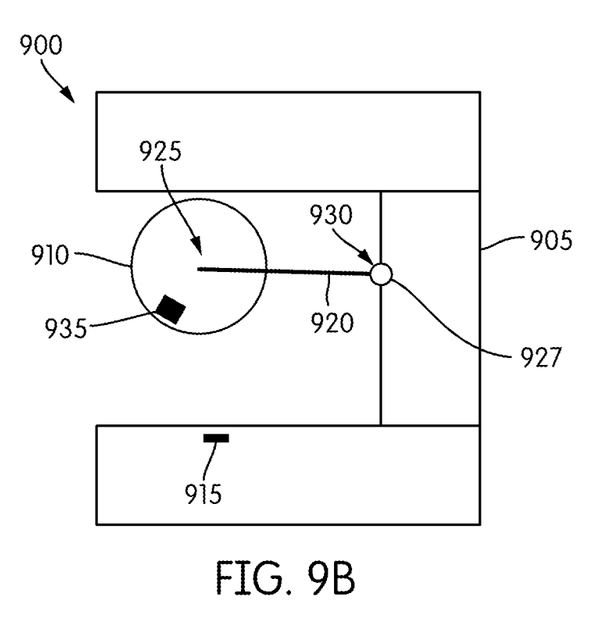

FIGS. 9A & 9B illustrate a cross-section of a sensing system 900 according to another embodiment. Sensing system 900 includes a guide 905, a float 910, and a sensor 915. The sensor 915 may be similar to sensor 135 discussed above. The float 910 is pivotably connected to the guide 905 via an arm 920. In the illustrated embodiment, the arm 920 is substantially rigid and pivotably attached to the float 910 at a first end 925 and pivotably attached to the guide 905, via an attachment point 927, at a second end 930, opposite the first end 925. In some embodiments, the float 910 includes a magnet 935 configured to be sensed by the sensor 915.

FIG. 9A illustrates the sensing system 900 sensing a fluid having a density lower than the predetermined density threshold. FIG. 9B illustrates the sensing system 900 sensing a fluid having a density higher than the predetermined density threshold.

Figure 10A:
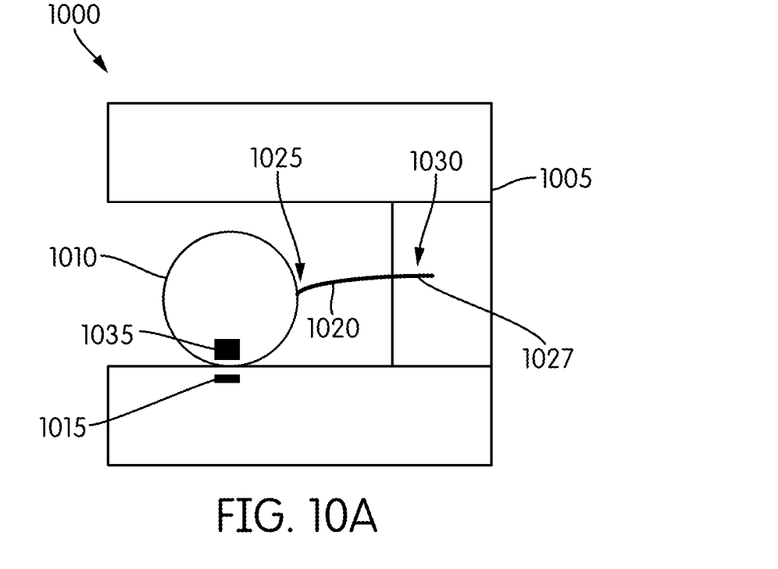
FIGS. 10A-10B illustrate a sensing system according to another embodiment.
Figure 10B:
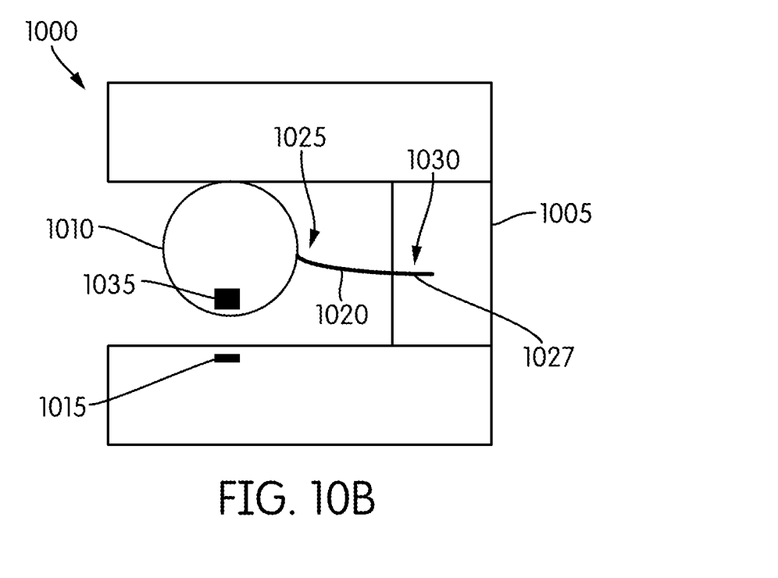

FIGS. 10A & 10B illustrate a cross-section of a sensing system 1000 according to another embodiment. Sensing system 1000 includes a guide 1005, a float 1010, and a sensor 1015. The sensor 1015 may be similar to sensor 135 discussed above. The float 1010 is pivotably connected to the guide 1005 via an arm 1020. In the illustrated embodiment, the arm 1020 is flexible and attached to the float 1010 at a first end 1025 and attached to the guide 1005, via an attachment point 1027, at a second end 1030, opposite the first end 1025. In some embodiments, the arm 1020 is a spring. In some embodiments, the float 1010 includes a magnet 1035 configured to be sensed by the sensor 1015.

FIG. 10A illustrates the sensing system 1000 sensing a fluid having a density lower than the predetermined density threshold. FIG. 10B illustrates the sensing system 1000 sensing a fluid having a density higher than the predetermined density threshold.

Figure 11:
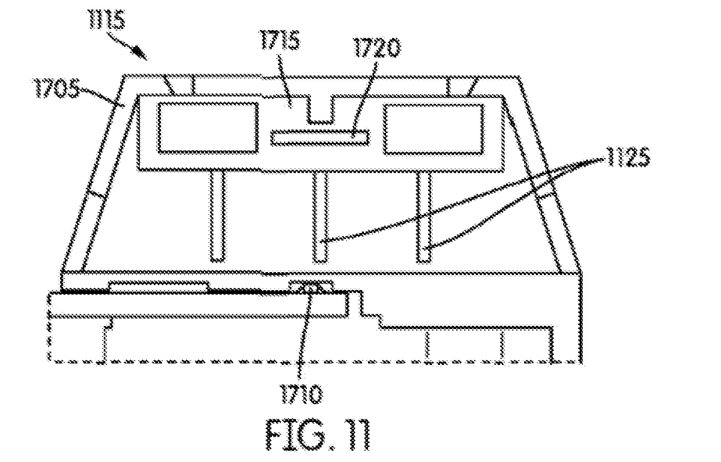
FIG. 11 is a cross-sectional cutaway view illustrating a fluid density sensor according to some embodiments.

FIG. 11 illustrates cross-sectional cutaway view of the digital fluid density switch 1115. In the example illustrated, the digital fluid density switch 1115 includes a cage 1705 with openings 1125 that allow fluid to enter the cage 1705. The digital fluid density switch 1115 also includes a magnetic sensor, or switch, 1710 and a float 1715 with a permanent magnet 1720. The magnetic sensor 1710 monitors, or measures, the position of the float 1715 within the cage 1705. The permanent magnet 1720 is mechanically coupled to the float 1715. For example, in some embodiments, the permanent magnet 1720 may be located within the float 1715 or may be attached to an outside surface of the float 1715. The float 1715 has a density that is below the density of standard DEF (that is, DEF with a predetermined fluid density). Such a density of the float 1715 may be achieved by material combinations of air (within a pocket), plastic (having a lower density than DEF), and a sensing target element (having a greater density than DEF, for example a magnet) of float 1715 as shown schematically in FIGS. 8 and 9. Due to the density of the float 1715 being near the low end of the density of DEF that has an adequate urea concentration, the float 1715 sinks to the bottom of the cage 1705 when the density of the DEF is too low (that is, when the concentration of urea is inadequate for an effective selective catalytic reduction process). Conversely, the float 1715 rises above the bottom of the cage 1705 (as shown in FIG. 11) when the density of the DEF is adequate (that is, when the concentration of urea is adequate for an effective selective catalytic reduction process). The magnetic switch 1710 is used to determine the position of the float 1715 (in particular, the permanent magnet 1720) within the cage 1705. For example, in some embodiments, the magnetic switch 1710 is a Hall switch, a reed switch, or another switch where a state of the magnetic switch depends on the magnetic field at the location of the magnetic switch 1710. Accordingly, the magnetic field at the location of the magnetic switch 1710 is altered based on the location of the permanent magnet 1720 within the float 1715. It should be understood that in some embodiments other sensing technologies may be used to identify the position of the float 1715. Magnetic sensor 1710 may directly or indirectly output the information signal via an analog line or digital line, for example the signal may use pulse-width modulation (PWM), a controller area network (CAN), a single edge nibble transmission (SENT), a local interconnect network (LIN), or other communication protocol.

Figure 12:
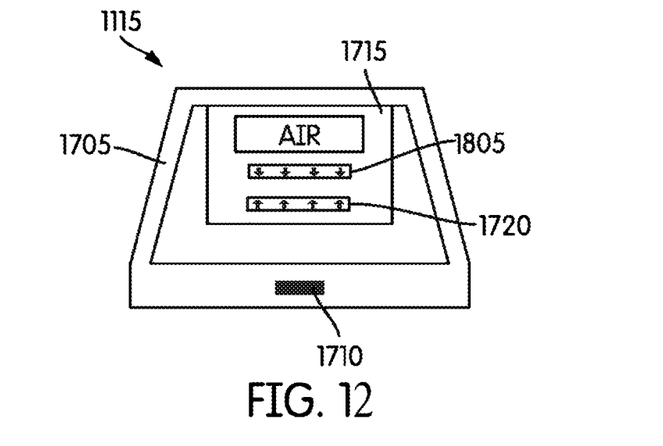
FIG. 12 is a schematic drawing illustrating the fluid density sensor of FIG. 11 according to some embodiments.

FIG. 12 is a schematic diagram of the digital fluid density switch 1115 with a second permanent magnet 1805 in the float 1715. As shown by FIG. 12, in some embodiments, the digital fluid density switch 1115 includes components to reduce or eliminate the effects that external magnetic fields (or externally generated magnetic fields) have on the float 1715. When the float 1715 is in the presence of an externally generated magnetic field, the float 1715 may be rotated or moved up or down within the cage 1705 due to interaction between the permanent magnet 1720 and the externally generated magnetic field. As shown in FIG. 12, in some embodiments, the float 1715 includes the second permanent magnet 1805 to reduce or eliminate the net force experienced by the float 1715 due to externally generated magnetic fields. As indicated by arrows on the permanent magnets 1720 and 1805, the permanent magnets 1720 and 1805 have opposite polarity. Accordingly, forces experienced by the permanent magnets 1720 and 1805 from externally generated magnetic fields largely cancel each other. Thus, the position of float 1715 is unaffected by externally generated magnetic fields. Nevertheless, the position of the float 1715 may still be determined by the magnetic switch 1710, which senses whether the permanent magnet 1720 is near the magnetic switch 1710. It should be noted that the float 1715 may include other configurations of permanent magnets to further reduce or eliminate the effects that externally generated magnetic fields have on the float 1715. For example, multiple magnets or multiple magnet segments, may be magnetized such that the net force on the float 1715 due to externally generated magnetic fields is reduced or eliminated. The multiple magnet segments may be the same shape or may be different shapes. Furthermore, the multiple magnet segments may be in the same plane or may be in different planes.

Figure 13:
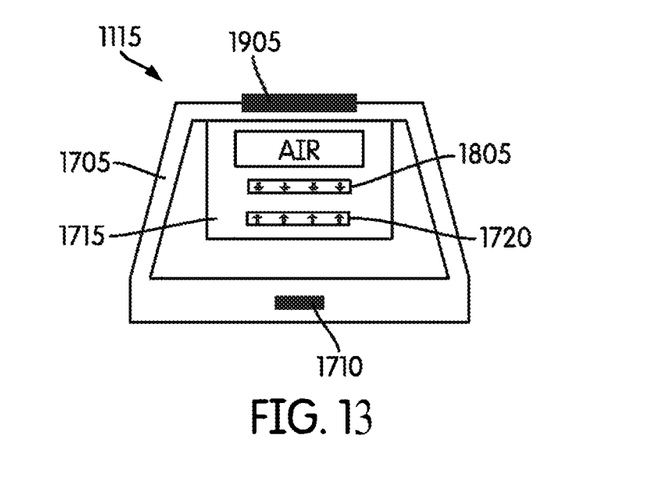
FIG. 13 is a schematic drawing illustrating the fluid density sensor of FIG. 11 according to another embodiment.

FIG. 13 is a schematic diagram of the digital fluid density switch 1115 with ferromagnetic material, or a second permanent magnet, 1905 proximate, or on top of, the cage 1705. The cage 1705 is mechanically designed to reduce laminar flow and turbulence of the fluid within the cage 1705 for stable movement of the float 1715.

In some embodiments, the digital fluid density switch 1115 includes components to help prevent the float 1715 from moving due to vibration or due to a flow of fluid through the cage 1705. For example, when experiencing vibration or a flow of fluid through the cage 1705, the float 1715 may not stay near the top of the cage 1705 even though the density of the fluid is adequate. As shown in FIG. 13, in some embodiments, the top of the cage 1705 includes the ferromagnetic material 1905 to attract the second permanent magnet 1805 of the float 1715. The attraction between the ferromagnetic material 1905 and the second permanent magnet 1805 is meant to be weak so as not to influence the measurement of the density of the fluid. For example, when the fluid in the reservoir 1105 has a density that is too low, the float 1715 will sink to the bottom of the cage 1705. Conversely, when the fluid in the reservoir 1105 has a density that is adequate, the float 1715 will float to the top of the cage 1705. When the float 1715 is at the top of the cage 1705, the slight attraction of the permanent magnet 1805 to the ferromagnetic material 1905 will keep the float 1715 at the top of the cage 1705 even when the digital fluid density switch 1115 experiences vibration and/or fluid flowing through the cage 1705. It should be understood that the ferromagnetic material 1905 may be used in other embodiments such that it slightly attracts other magnets in the float 1715 in addition to or alternatively to the second permanent magnet 1805.

Thus, embodiments provide, among other things, a sensing system configured to sense a characteristic of a fluid. Various features and advantages are set forth in the following claims.

What is claimed is:

1. A system for detecting a characteristic of a fluid, the system comprising:
   a tube configured to receive the fluid, the tube including
      a base with a first angled portion;
   a float located within the tube, the float including a top
      portion with a second angled portion;
   a sensor configured to sense a position of the float; and
   a controller configured to
      receive, from the sensor, the position of the float, and
      determine a characteristic of the fluid based on the
         position of the float, wherein the characteristic is at least one selected from the group consisting of a density and a concentration,
wherein the first angled portion is contoured to allow the float to stay oriented with respect to a horizontal reference line when the float is positioned near the base such that the orientation of the float is substantially constant at a plurality of operating angles.

2. The system of claim 1, wherein the sensor comprises a magnetic sensor.

3. The system of claim 2, wherein the float is at least partially formed of a magnetic material.

4. The system of claim 1, wherein a float density of the float is slightly greater than a fluid density threshold of the fluid.

5. The system of claim 1, wherein a float density of the float is set to a fraction of a fluid density threshold of the fluid.

6. The system of claim 1, wherein the float is formed of a combination of two or more materials.

7. The system of claim 1, wherein the float includes a channel.

8. The system of claim 1, wherein the system is configured to detect the characteristic of the fluid when operating within a range of approximately 0° to approximately 20° with respect to a horizontal reference line.

9. The system of claim 1, wherein the tube includes an arm configured to guide the float.

10. The system of claim 1, wherein the float is connected to a guide via an arm.

11. The system of claim 10, wherein the arm comprises a spring.

12. The system of claim 1, wherein the sensor is an analog sensor.

13. The system of claim 1, wherein the sensor is a digital sensor.

14. A method of detecting a characteristic of a fluid, the method comprising:
sensing, via a sensor, a first position of a float located within a tube configured to receive the fluid when the tube and the sensor are at a first angle;
determining, via a controller, a characteristic of the fluid based on the first position of the float;
sensing, via the sensor, a second position of the float located within the tube configured to receive the fluid when the tube and the sensor are at a second angle; and
determining, via the controller, the characteristic of the fluid based on the second position of the float;
wherein the characteristic is at least one selected from the group consisting of a density and a concentration.

15. The method of claim 14, wherein the sensor comprises a magnetic sensor.

16. The method of claim 15, wherein the float is at least partially formed of a magnetic material.

17. The method of claim 14, wherein a float density of the float is slightly greater than a fluid density threshold of the fluid.

18. The method of claim 14, wherein a float density of the float is approximately equal to a fluid density threshold of the fluid.

19. The method of claim 14, further comprising forming the float using a combination of two or more materials.

20. The method of claim 14, wherein the float includes a channel.

21. A fluid sensor comprising:
a cage configured to be located within a tank and including an opening to allow a fluid into the cage;
a float located within the cage and having a float density that is a predetermined density;
a first permanent magnet mechanically coupled to the float;
a second permanent magnet mechanically coupled to the top of the cage;
a third permanent magnet coupled to the float having a polarity opposite the first permanent magnet, wherein the third permanent magnet is configured to reduce the effect of an external magnetic field acting on the float, and
a magnetic switch configured to determine a position of the float within the cage, wherein a state of the magnetic switch indicates whether a fluid density of the fluid is less than the predetermined density,
wherein, when the float is at the top of the cage, the first permanent magnet experiences an attraction to the second permanent magnet.

22. The fluid sensor of claim 21, wherein the cage is configured to reduce laminar and turbulence flows within the sensor.

23. A fluid sensor comprising:
a guide tube, the guide tube including a base, a receiving area, a first arm, and a second arm, wherein the first arm and the second arm extend from the base, and wherein the receiving area is configured to receive a fluid;
a magnetic switch configured to determine a position of a float, wherein the position of the float relates to a density of a fluid, wherein the float includes a top portion and a bottom portion, and wherein the first arm and the second arm guide the float via the top portion; and
a sensing integrated circuit including
a magnetic angle sensor configured to measure an angle of a magnetic field, wherein the angle of the magnetic field relates to a fluid level of the fluid,
a temperature sensor configured to measure a temperature of the fluid, and
a digital input coupled to the magnetic switch,
wherein the sensing integrated circuit is configured to transmit an output signal that relates to the fluid level, the temperature of the fluid, and the density of the fluid.

24. The fluid sensor of claim 23, wherein the magnetic field is configured to reduce the effects of an external magnetic field.

25. The fluid sensor of claim 23, wherein the magnetic angle sensor is an analog sensor.

26. The fluid sensor of claim 23, wherein the magnetic angle sensor is a digital sensor.

* * * * *